United States Patent [19]

Izumi et al.

[11] 4,395,199
[45] Jul. 26, 1983

[54] CONTROL METHOD OF A SYSTEM OF INTERNAL COMBUSTION ENGINE AND HYDRAULIC PUMP

[75] Inventors: Eiki Izumi; Hiroshi Watanabe; Yukio Aoyagi, all of Chiyoda; Kazuo Honma, Amimachi; Kichio Nakajima, Shimoinayoshi, all of Japan

[73] Assignee: Hitachi Construction Machinery Co., Ltd., Tokyo, Japan

[21] Appl. No.: 276,367

[22] PCT Filed: Oct. 14, 1980

[86] PCT No.: PCT/JP80/00247
§ 371 Date: Jun. 15, 1981
§ 102(e) Date: Jun. 15, 1981

[87] PCT Pub. No.: WO81/01031
PCT Pub. Date: Apr. 16, 1981

[30] Foreign Application Priority Data

Oct. 15, 1979 [JP] Japan .................. 54-131846
Mar. 14, 1980 [JP] Japan .................. 55-31584
Mar. 14, 1980 [JP] Japan .................. 55-31585
May 13, 1980 [JP] Japan .................. 55-62309

[51] Int. Cl.³ .................................. F04B 49/00
[52] U.S. Cl. .............................. 417/53; 60/449; 417/34; 417/222
[58] Field of Search ................... 417/218–222, 417/34, 53, 15; 60/445, 447, 449, 451

[56] References Cited

U.S. PATENT DOCUMENTS

| 3,788,775 | 1/1974 | Leutner et al. | 417/222 |
| 3,841,795 | 10/1974 | Ferre et al. | 417/216 |
| 3,891,354 | 6/1975 | Bosch | 417/216 |
| 3,914,938 | 10/1975 | Cornell et al. | 60/395 |
| 3,969,896 | 7/1976 | Louis | 60/449 X |
| 4,074,955 | 2/1978 | Nonnemacher et al. | 417/218 |
| 4,178,132 | 12/1979 | Shiraishi et al. | 417/5 |

FOREIGN PATENT DOCUMENTS

| 45-3329 | 2/1970 | Japan . |
| 45-23266 | 8/1970 | Japan . |
| 47-40216 | 10/1972 | Japan . |
| 47-40226 | 10/1972 | Japan . |
| 48-64332 | 9/1973 | Japan . |
| 52-154932 | 12/1977 | Japan . |

Primary Examiner—Edward K. Look
Attorney, Agent, or Firm—Antonelli, Terry & Wands

[57] ABSTRACT

A control method of a system for generating hydraulic power, the system including an internal combustion engine controlled by fuel injection from a fuel injection pump, and a plurality of hydraulic pumps of the variable displacement type. An engine speed deviation is obtained by calculating a difference between a target engine speed set by a manipulated variable of an accelerator for the internal combustion engine and an output engine speed of the engine. The engine speed deviation is converted into a pump control coefficient which is in a functional relation with this deviation. A calculation is performed with the converted value and an externally manipulated variable for inclination of a swash plate of the hydraulic pump, and the calculated value is supplied to a regulator of the hydraulic pump as a target value for inclination of the swash plate thereof to thereby control the inclination angle of the swash plate of the hydraulic pump. At the same time, the engine speed deviation is converted into a rack displacement target value which is a functional relation with this deviation, and the rack displacement of the fuel injection pump is adjusted by the converted value to thereby control the amount of fuel injection.

12 Claims, 29 Drawing Figures

F I G. 21
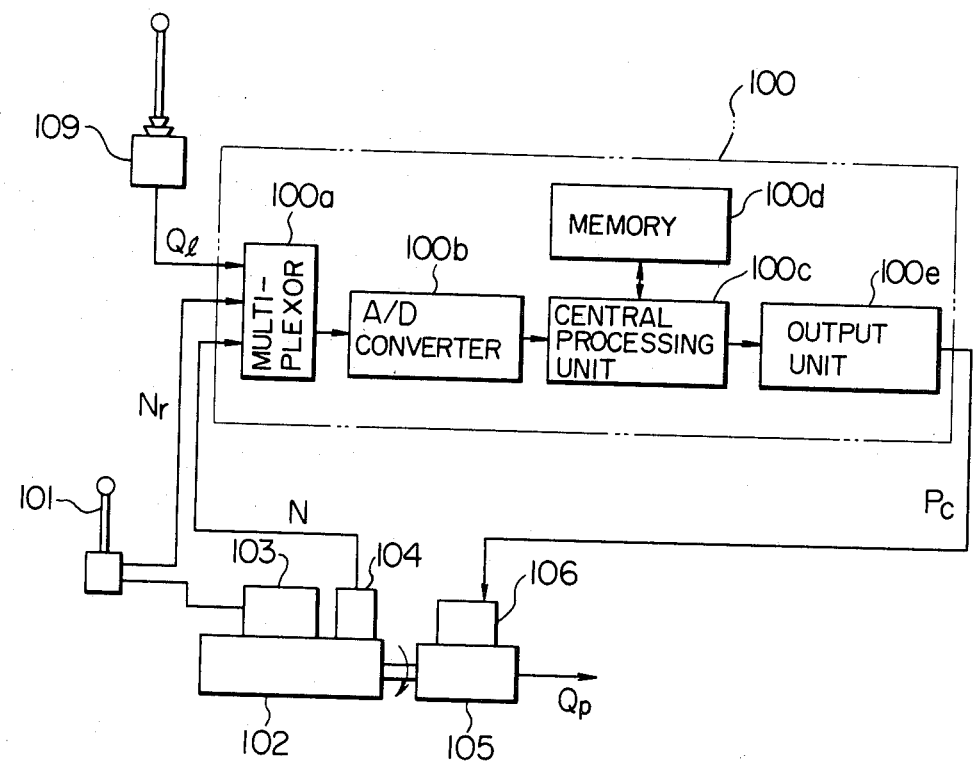

CONTROL METHOD OF A SYSTEM OF INTERNAL COMBUSTION ENGINE AND HYDRAULIC PUMP

TECHNICAL FIELD

This invention relates to a method of controlling a system for generating hydraulic power, such as a hydraulic shovel drive apparatus, which includes an internal combustion engine and a plurality of hydraulic pumps of the variable displacement type driven thereby.

BACKGROUND OF THE INVENTION

Heretofore, in a system for generating hydraulic power, such as a drive apparatus for a hydraulic shovel, by driving a plurality of hydraulic pumps of the variable displacement type by a single internal combustion engine, there have generally been three types of control means for distributing the output power which include:
  (a) individual control system;
  (b) cross-sensing system; and
  (c) full power control system.

The individual control system (a) is such that when for example, two hydraulic pumps are provided one-half the maximum output power of the internal combustion engine is distributed to each of the hydraulic pumps, and the circuit pressure for each hydraulic pump is sensed individually to thereby control the delivery of each pump. A disadvantage of this system, resides in the fact that, when no load is applied to one hydraulic pump, it is impossible for the other hydraulic pump to utilize the residual power.

The cross-sensing system (b) is such that, by enabling two hydraulic pumps to transmit their circuit pressures to each other, one of the pumps can utilize part of the residual power of the other pump when the load applied to the other pump is low. This system is superior to the individual control system in utilization of power, but the regulators for controlling pump delivery are complex in construction.

Meanwhile, the full power control system (c) is such that a reduction in the running speed of the internal combustion engine is sensed to control delivery of the hydraulic pumps, and is regarded as the most excellent system from the view point of utilization of power. One example of this system is proposed in Patent Application Laid-Open No. 4601/75. Although this proposed system is excellent in principle in that a reduction in the running speed of the internal combustion engine is detected and the angle of inclination of the hydraulic pumps is restricted, it is faced with many problems, because the system utilizes hydraulic means for attaining the desired end. However, by utilization of hydraulic means, this system has a low responsiveness and it is susceptible to the influences of variations in oil temperature. Moreover difficulties are encountered in following changes in the running speed set for the internal combustion engine, as well as in maintaining the dynamic stability of the entire system in good condition. Furthermore, the necessary regulators become complex in construction when attempts are made to externally operate the maximum value of the pumps' inclination angle.

An object of this invention is to provide a method of controlling a system for generating hydraulic power, which system includes an internal combustion engine and plurality of hydraulic pumps of the variable displacement type driven thereby, so as to enable a realization of full power control of excellent responsiveness and dynamic stability.

Another object of the invention is to provide a control method the hydraulic power generating system, which enables a realization of full power control which is free from stopping or shut down of the internal combustion engine.

Yet another object of the invention is to provide a control method for the hydraulic power generating system, so as to enabling a realization of full power control which suppress a reduction in output torque in a region of low speed of the internal combustion engine while causing no incomplete combustion, such as production of black smoke in a region of high engine speed.

A further object of the invention is, to provide a method of controlling a system for generating hydraulic power, which system includes an internal combustion engine and at least one hydraulic pump of the variable displacement type driven thereby, to realize a control method in which, when the angle of inclination of the swash plate of the pump is controlled by using a pump control coefficient associated with engine speed deviation, there is no occurence of sudden changes in pump delivery such as a reduction in pump delivery which would occur due to a reduction in the inclination angle in spite of an operation performed to increase the output engine speed, and an increase in pump delivery which would occur due to an increase in the inclination angle in spite of an operation performed to reduce the output engine speed.

BRIEF SUMMARY OF THE INVENTION

According to the invention, there is provided a method of controlling a system for generating hydraulic power including an internal combustion engine controlled by fuel injection by a fuel injection pump, and a plurality of hydraulic pumps of the variable displacement type driven by the internal combustion engine, characterized in that the method comprises the steps of calculating the difference between a target engine speed set by a manipulated variable of an accelerator for the internal combustion engine and an output engine speed to obtain an engine speed deviation; converting the engine speed deviation into a pump control coefficient which is in a functional relation with the deviation, performing a calculation with the converted value and an externally manipulated variable for inclination of a swash plate of the hydraulic pump, and inputting the calculated value to a regulator of the hydraulic pump as a target value for inclination of the swash plate thereof to thereby control the inclination angle of the swash plate of the hydraulic pump; and simultaneously converting the engine speed deviation into a rack displacement target value which is in a functional relation with the deviation, and adjusting the rack displacement of the fuel injection pump by the converted value to thereby control the amount of fuel injection.

Preferably, the functional relation between the engine speed deviation and the pump control coefficient is such that the pump control coefficient decreases when the engine speed deviation becomes greater than a predetermined value. The functional relation between the engine speed deviation and the rack displacement target value may be such that the rack displacement target value gradually increases until the engine speed deviation reaches a predetermined value and thereafter the rack displacement target value is determined to conform to the running condition of the internal combustion engine based on either one of a plurality of functions set to correspond to the running conditions of idling, intermediate speed and high speed of the internal combustion engine. The maximum rack displacement target value for each output speed of the internal combustion engine may be set such that it decreases as the output engine speed increases, and, when the rack displacement target value converted from the engine speed deviation is greater than the maximum rack displacement target value corresponding to the prevailing output engine speed, the rack displacement at the output engine speed is controlled by the maximum value that has been substituted for the rack displacement target value.

Preferably, the predetermined value of the engine speed deviation is changed depending on the target engine speed. In this case, the engine speed deviation may be calculated with an amended value which increases as the target engine speed decreases to obtain an amended engine speed deviation, and the pump control coefficient decreases when the amended engine speed deviation becomes greater than a predetermined value.

Preferably, the control method according to the invention is such that an increment of the engine speed deviation which is the difference between the target engine speed and the output engine speed is calculated, an increment of the output engine speed is calculated, judgment is passed as to whether or not the positive and negative signs of the two increments are alike, and when they are alike, a pump control coefficient having a value corresponding to the pump coefficient immediately before the signs of the two increments become alike, is used as the pump control coefficient to perform the calculation with the externally manipulated variable for the inclination of the swash plate.

Also, preferably, the control method according to the invention is such that a change in the target engine speed is sensed and when the the target engine speed under goes a change, the target values for inclination of the swash plates are maintained for a predetermined time at the target value of inclination of the swash plate of immediately before the target engine speed undergoes the change. The predetermined time may be caused by vary depending on a change in target engine speed.

Moreover, according to the invention, there is provided a method of controlling a system for generating hydraulic power, which system includes an internal combustion engine and at least one hydraulic pump of the variable displacement type driven thereby, wherein an engine speed deviation, which is the difference between a target engine speed and an output engine speed, is obtained based on a target engine speed signal produced by operation of an accelerator lever and an output engine speed signal detected by a sensor, the engine speed deviation is converted into a corresponding pump control coefficient based on the pump control coefficient previously set as a function of the difference between the target engine speed and the output engine speed and calculation is performed with said pump control coefficient and a target speed based on a target speed signal produced by operation of an operation lever to obtain a target pump delivery to thereby control the hydraulic pump in accordance with the target pump delivery signal characterized in that the method comprises the steps of calculating an increment of the engine speed deviation which is the difference between the target engine speed and the output engine speed, calculating an increment of the output engine speed, passing judgement as to whether or not the positive and negative signs of the two increments are alike, and using, when they are alike, a pump control coefficient having a value corresponding to the pump control coefficient immediately before the signs of the two increments become alike as the pump control coefficient to perform the calculation with the target speed.

Further, according to the invention, there is provided the control method for the system of generating hydraulic power in which the method comprises the steps of detecting a change in the target engine speed, and maintaining, when the target engine speed undergoes a change, the target pump delivery for a predetermined time at the target pump delivery immediately before the target engine speed undergoes the change. The predetermined time may be caused to vary depending on a change in the target engine speed.

BRIEF DESCRIPTION OF THE DRAWINGS

FIG. 21 is a schematic view of a system provided with a digital control unit comprising still another embodiment of the control method in conformity with the invention;

DETAILED DESCRIPTION OF THE INVENTION

Figure 1:
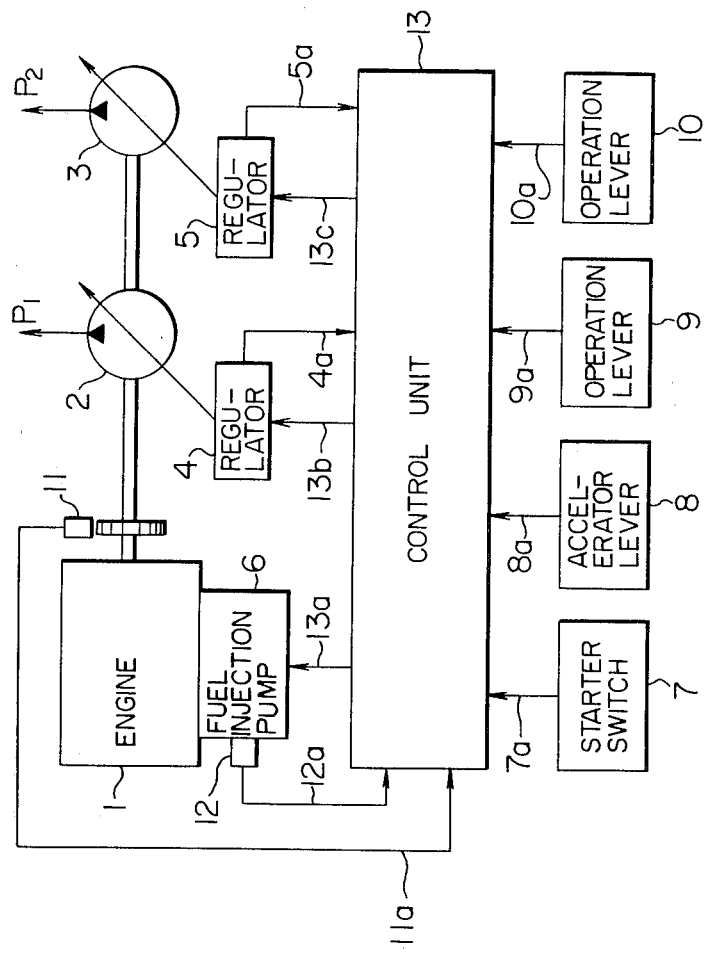
FIG. 1 is a block diagram of a system for generating hydraulic power which incorporates therein one embodiment of the control method in conformity with the invention.

Referring now to the drawings wherein like reference numerals are used throughout the various views to designate like parts and, more particularly, to FIG. 1, according to this figure, a system for generating hydraulic power includes an internal combustion engine 1, and a plurality of hydraulic pumps 2, 3 of the variable displacement type driven by the engine 1. Regulators 4, 5 are provided for controlling the angle of inclination of swash plates (or inclined axes) 2a and 2b of the pumps 2 and 3, respectively. A fuel injection pump 6 for the internal combustion engine 1 supplies fuel to the internal combustion engine 1 in a desired amount as a rack thereof is operated. The system further includes a starter switch 7 for the internal combustion engine 1, an accelerator lever 8 for the internal combustion engine 1, and operation levers 9, 10 for externally operating the maximum values of the angle of inclination of the pumps 2 and 3, respectively. A sensor 11 senses the output speed of the internal combustion engine 1, and a sensor 12 senses the rack displacement of the fuel injection pump 6. A control unit 13 controls the fuel injection pump 6 of the internal combustion engine 1 and the angle of inclination of the pumps 2 and 3, with the unit 13 calculating a rack operating signal 13a and inclination angle operating signals 13b and 13c for the pumps 2 and 3 and producing outputs based on a start signal 7a from the starter switch 7, an accelerator manipulated variable signal 8a from the accelerator lever 8 corresponding to the target engine speed of the internal combustion engine 1, an inclination angle manipulated variable signals 9a and 10a for the pumps 2 and 3 from the operation levers 9 and 10, an output engine speed signal 11a for the internal combustion engine 1 from the sensor 11 and a signal 12a of rack displacement Y for the fuel injection pump 6 from the sensor 12, and inclination angle signals 4a and 5a from the regulators 4 and 5 of the pumps 2 and 3.

Figure 2:
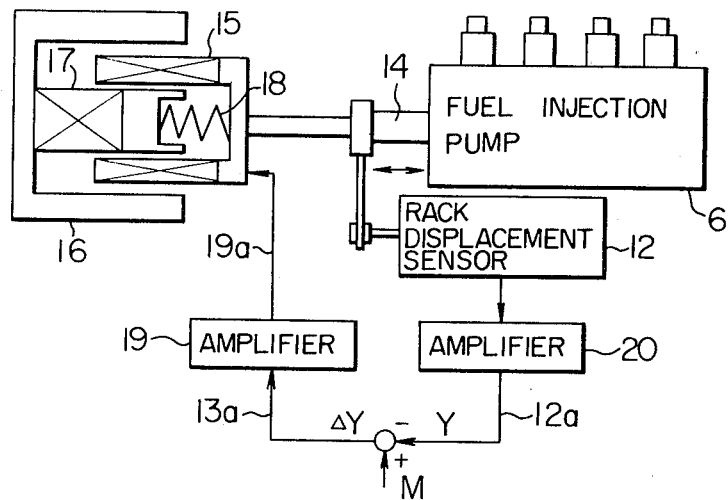
FIG. 2 is a schematic view of a fuel injection pump and the rack drive means of the system shown in FIG. 1.

As shown in FIG. 2 the amount of fuel injected into the internal combustion engine 1 is determined by a function of displacement of a rack 14. The rack 14 is driven by a movable coil 15 cooperable with a yoke 16, a permanent magnet 17, and a return spring 18 for the rack 14. A current amplifier 19 receives the rack operating signal 13a from the control unit 13 and produces a DC current signal or a pulse amplitude modulation signal 19a for driving the movable coil 15. A sensing signal of the rack displacement sensor 12 is fedback to the control unit 13 as the rack displacement signal 12a through an amplifier or shaping circuit 20.

Figure 3:
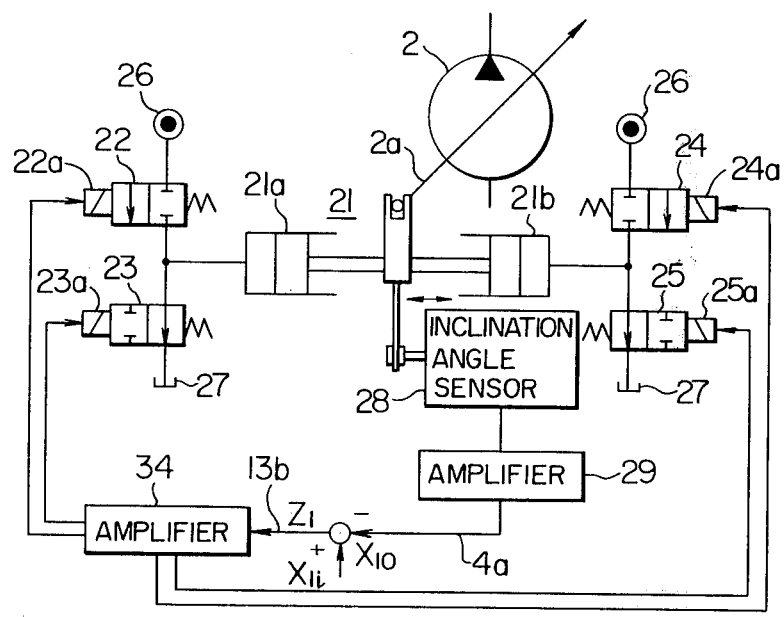
FIG. 3 is a schematic view of an inclination angle drive means of the pumps of the system shown in FIG. 1.

As shown in FIG. 3, the swash plate (or inclined axis) 2a of the pump 2 is driven by a hydraulic cylinder 21a and a hydraulic cylinder 21b. The hydraulic cylinders 21a and 21b are controlled by four two-position, two-way electromagnetic valves 22, 23, 24 and 25. More specifically, upon energization of a solenoid 22a of the electromagnetic valve 22 and a solenoid 23a of the electromagnetic valve 23, pressurized liquid from a pilot hydraulic liquid source 26 acts on the hydraulic cylinder 21a and at the same time the hydraulic cylinder 21b is communicated with a reservoir 27, so that the pump 2 has its inclination angle increased. Conversely, upon energization of a solenoid 24a of the electromagnetic valve 24 and a solenoid 25a of the electromagnetic valve 25, the pump 2 has its inclination angle reduced. Energization of the solenoid 23a of the electromagnetic valve 23 and the solenoid 25a of the electromagnetic valve 25 closes all the circuits of the electromagnetic valves 22–25, so that the pump 2 keeps the inclination angle unchanged. A sensor 28 senses the inclination angle of the pump 2 and an output signal from the sensor 28 is fedback to the control unit 13 as the pump inclination angle signal 4a through an amplifier or shaping circuit 29. The regulator 5 for the pump 3 is of the same construction, so that its detailed description will be omitted.

The control method according to the invention will now be described by reference to FIG. 4.

An output of an accelerator manipulated variable from the accelerator lever 8 is supplied to the control unit 13 as a target engine speed Nr for the internal combustion engine 1. The target engine speed Nr is compared with an output engine speed N of the internal combustion engine 1 sensed by the sensor 11. The difference ΔN is an engine speed deviation. The engine speed deviation ΔN is converted by a rack displacement target value generating circuit 30 into a rack displacement target value M. The difference ΔY between the rack displacement target value M and a rack displacement Y sensed by the displacement sensor 12 is supplied to the current amplifier 19 as an output and drives the movable coil 15 of the fuel injection pump 6. Thus, the rack displacement Y is controlled by the rack displacement target value M, so that the amount of fuel injected by the fuel injection pump 6 shows a change and explosive combustion occurs in a combustion system 31 of the internal combustion engine 1 to thereby produce an output torque Te and accelerate a flywheel 32. Meanwhile a torque reaction Tp from the pumps 2 and 3 acts on the flywheel 32, and the output engine speed N is determined when the two torques Te and Tp balance.

When the torque reaction Tp from the pumps 2 and 3 is too high and overcomes the maximum torque of the combustion system 31, the output engine speed is lowered until the engine is stopped or shut down. To avoid this phenomenon, means is provided for controlling the powers of the pumps 2, 3. More specifically, the engine speed deviation $\Delta N$ of the internal combustion engine 1 is converted into a pump control coefficient Kp by a pump control coefficient generating circuit 33. As shown in FIG. 5, the pump control coefficient generating circuit 33 has a characteristic such that when the engine speed deviation $\Delta N$ is in a range lower than a predetermined set value $\Delta No$, the value 1 is generated as the pump control coefficient Kp, and when the engine speed deviation $\Delta N$ exceeds the predetermined set value $\Delta No$, the value of the pump control coefficient Kp is reduced nearly to zero as the engine speed deviation $\Delta N$ increases. This characteristic is stored in a memory as a function of $Kp = h(\Delta N)$. The pump control coefficient Kp obtained by the pump control coefficient generating circuit 33 is calculated with an output $L_1$ of the operation lever 9 of the pump 2 as shown in FIG. 4. In this embodiment, the calculation is multiplication. The multiplied value $Kp \cdot L_1$ is an inclination angle instruction $X_{1i}$ for the pump 2. The pump control coefficient Kp is preferably multiplied with an output $L_2$ of the operation lever 10. The multiplied value $Kp \cdot L_2$ is an inclination angle instruction $X_{2i}$ for the pump 3. The difference $Z_1$ between the inclination angle instruction $X_{1i}$ for the pump 2 and an inclination angle $X_{10}$ of the pump 2 from the sensor 28 is amplified by an amplifier 34 and controls the displacement of the hydraulic cylinder 21 for operating the swash plate. The inclination angle $X_{10}$ of the pump 2 and a load pressure $P_1$ thereof are changed into the form of a product to produce a torque reaction $Tp_1$ of the pump 2. The same is true of a torque reaction $Tp_2$ of the pump 3, and the sum Tp of the two values becomes the torque reaction Tp of the internal combustion engine 1. With the control system of this construction, when the torque reaction Tp of the pumps 2 and 3 increases and the engine speed N of the internal combustion engine 1 decreases to cause an increase in engine speed deviation $\Delta N$, the pump control coefficient Kp becomes smaller in accordance with the increase in $\Delta N$, so that the inclination angles $X_{10}$ and $X_{20}$ of the pumps 2 and 3 respectively decrease to avoid a great reduction in the output engine speed N of the internal combustion engine 1.

Figure 6:
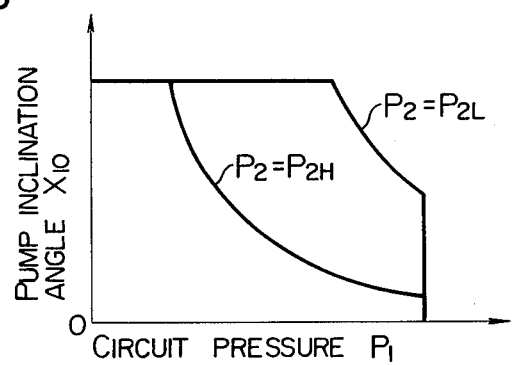
FIG. 6 is a diagrammatic view showing the pump characteristic obtained when the control method according to the invention shown in FIG. 4 is used.

The characteristic of the pump 2 obtained when the aforesaid control is effected is shown FIG. 6 illustrating the relation between a circuit pressure $P_1$ acting on the pump 2 and the inclination angle $X_{10}$ of the pump 2. More specifically, when a circuit pressure $P_2$ acting on the pump 3 is low ($P_2 = P_{2L}$), the inclination angle $X_{10}$ of the pump 2 shows no reduction until the circuit pressure $P_1$ of the pump 2 becomes high. However, when the circuit pressure $P_2$ of the pump 3 is high ($P_2 = P_{2H}$), the inclination angle $X_{10}$ of the pump 2 decreases at a stage of relatively low circuit pressure $P_1$ of the pump 2. In both cases, control is effected such that the output power (the product of the output engine speed and the output torque) of the internal combustion engine 1 is kept substantially at a constant value.

A control method for achieving the invention better will now be described.

Figure 7:
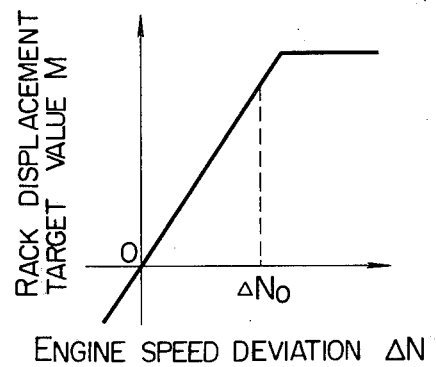
FIG. 7 is a diagrammatic view showing one example of the characteristic of the rack displacement target value generating circuit used in the control method according to the invention shown in FIG. 4.
Figure 9:
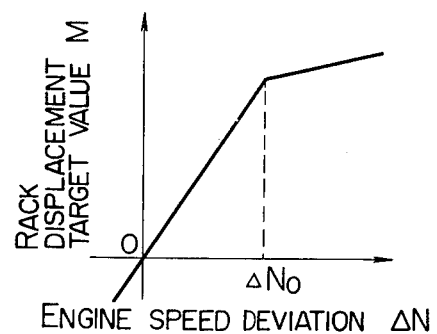
FIG. 9 is a diagrammatic view of another example of the characteristic of the rack displacement target value generating circuit used in the control method according to the invention shown in FIG. 4.
Figure 10:
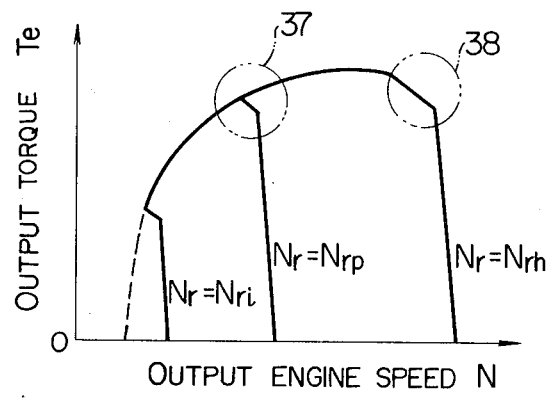
FIG. 10 is a diagrammatic view of characteristic of the output speed and an output torque of the internal combustion engine in the system obtained when the characteristic shown in FIG. 9 is used.

As shown in FIG. 7, the characteristic of the rack displacement target value generating circuit 30 consists of the combination of a linear increase straight line and a saturation straight line and is constructed such that the engine speed deviation $\Delta N$ becomes $\Delta N = \Delta No$ prior to achieving of saturation. At this time, when the target engine speed Nr for the internal combustion engine 1 is high (Nr = Nrh), as indicated by a two-dot chain line 35 in FIG. 8, even if the torque reaction Tp exceeds Teh, the output torque Te can be over Tep in $\Delta N > \Delta No$ and, therefore, no engine shutdown occurs if the inclination of the characteristic of the pump control coefficient Kp shown in FIG. 6 is not set at a extremely steep gradient or if the inclination angle is not suddenly reduced. However, when the target engine speed Nr = Nrp (intermediate speed) as indicated by a two-dot chain line 36 in FIG. 8 or when Nr = Nri (idling), if the torque reaction Tp reaches Tep or Tei, the output torque Te cannot be over Tep or Tei and, therefore, as soon as the rack displacement target value M reaches the saturation, the output torque decreases. Because of this, engine shutdown occurs unless the inclination in the characteristic of the pump control coefficient Kp is set at a steep gradient or unless the inclination angle is suddenly reduced. On the other hand, setting the inclination of the pump control coefficient Kp at a steep gradient is equivalent to setting the gain constant of the control system at a high level, so that there is the risk of causing the system to oscillate. In order to avoid such inconsistency, it may be effective to give the form shown in FIG. 9 to the characteristic of the rack displacement target value generating circuit 30. That is, as shown in FIG. 9, the inclination of the rack displacement target value M relative to the engine speed deviation $\Delta N$ advantageously rises gently in $\Delta N > \Delta N_o$. By this arrangement, the output characteristic of the internal combustion engine 1 becomes as shown in FIG. 10. The output torque Te increases as the output engine speed N decreases in a certain section after the point in time at which the pump control coefficient Kp decreases, and therefore engine shutdown is prevented from occuring if the inclination of the pump control coefficient Kp is not set at an extremely steep gradient, thereby increasing stability. This shows a good tendency during intermediate speed indicated by a two-dot chain line 37 in FIG. 10 or during idling, but the section of a rise in torque becomes longer than is necessary, during high speed, as indicated by a two-dot chain line 38 in FIG. 10, resulting in the disadvantage that the effective power is reduced at the corresponding rate. It is therefore understood that it is preferable that the characteristic shown in FIG. 9 is used during idling and intermediate speed and the characteristic as shown in FIG. 7 is selected for high speed. These characteristics are stored in a memory as a function of $M = f(\Delta N)$.

Figure 11:
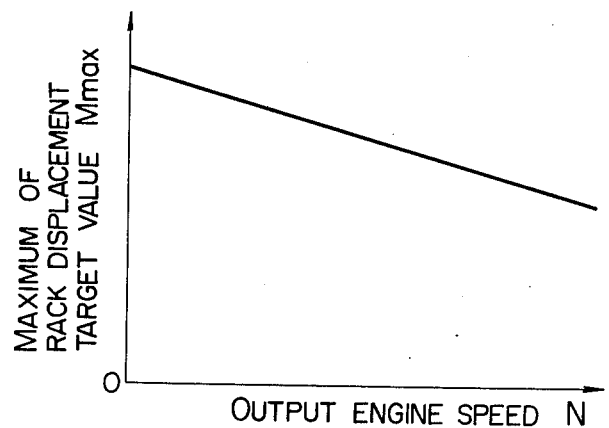
FIG. 11 is a diagrammatic view showing the maximum value of the rack displacement target value for obtaining the Angleich or tongue control characteristic of the internal combustion engine in the control method according to the invention shown in FIG. 4.
Figure 12:
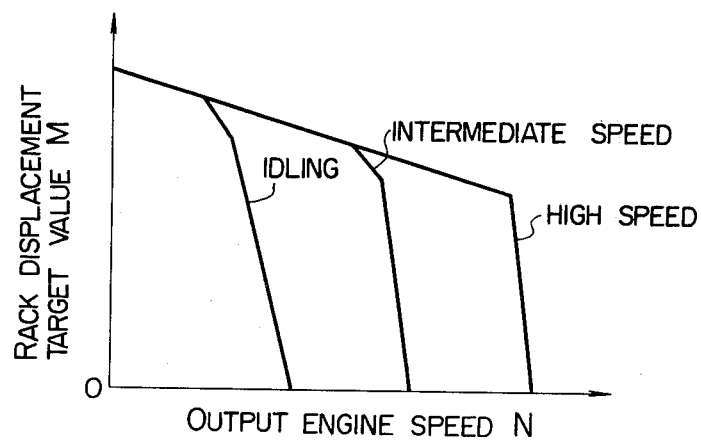
FIG. 12 is a diagrammatic view showing the relation between the speed and the rack displacement target value of the internal combustion engine obtained in the control method according to the invention shown in FIG. 4 when the Angleich characteristic is added.

Another control method rendering the output characteristics of the internal combustion engine more desirable will now be described. This control method is intended to obtain what is usually referred to as a tongue control or an Angleich characteristic of an internal combustion engine, which is adapted to control the maximum value of the rack displacement in accordance with the output engine speed of the internal combustion engine 1 or the accelerator manipulated variable. Generally, the fuel injection pump 6 shows such a characteristic that with the rack displacement being constant, the amount of fuel injected thereby increases as the engine speed of the internal combustion engine 1 increases. Thus, the output torque drops as the engine speed drops. If the maximum value of the rack displacement is adjusted to a high level to ensure torque in low engine speed region, the amount of injected fuel in high engine speed region would become so great that incomplete combustion would occur, causing black smoke to be ejected from the internal combustion engine 1. To avoid this problem, as shown in FIG. 11, the relation between the engine speed N of the internal combustion engine 1 and the maximum value Mmax of the rack displacement target valve M is set such that it has the characteristic of rising toward the left as the engine speed N drops. This characteristic is stored in a memory as a function of Mmax=g(N). Setting of the maximum value Mmax of the rack displacement target value M is carried out as follows. The rack displacement target value M shown in FIGS. 7 and 9 is compared with the maximum value Mmax of the rack displacement target value M shown in FIG. 11 and M=Mmax is substituted when M>Mmax so as to control the displacement of the rack 14 by the maximum value Mmax of the rack displacement target value M. When this control is effected, the relation between the engine speed N of the internal combustion engine 1 and the rack displacement target value M has a characteristic as shown in FIG. 12.

Figure 13:
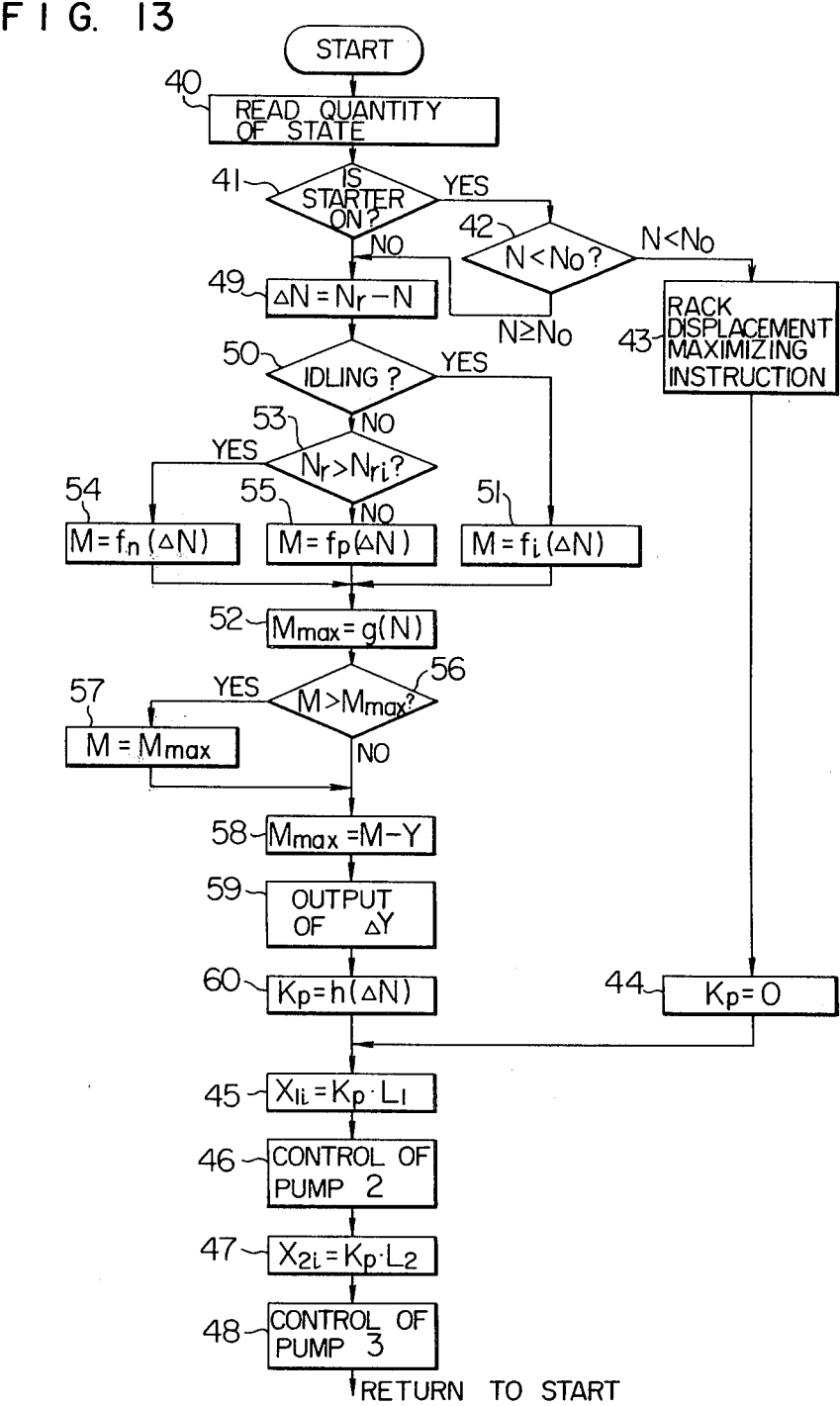
FIG. 13 is a flow chart of the control method according to the invention shown in FIGS. 4–12.

The aforesaid control method is carried out based on calculated instructions of the control unit 13 and this processing will be described by referring to the flow chart shown in FIG. 13.

First of all, in step 40, the quantity of state including the manipulated variable of the accelerator lever 8 (target engine speed Nr), output engine speed N, inclination angles $X_{10}$ and $X_{20}$ of the pumps 2 and 3, displacement Y of the rack 14, and manipulated variables $L_1$ and $L_2$ of the operation levers 9 and 10 for the inclination angles of the pumps 2 and 3 are read and stored in suitable memory addresses. Then in step 41, whether or not the starter switch 7 is on is checked. If the starter switch 7 is on, then the process jumps to step 42. In step 42, whether or not the output engine speed N is lower than the predetermined engine speen No is checked. If N<No, the process transfers to step 43 in which an instruction is given to maximize the amount of rack displacement. Then in step 44, the value of the pump control coefficient Kp is rendered zero before the process transfers to step 45. In step 45, the product of the value of the pump control coefficient Kp and the manipulated variable $L_1$ of the operation lever 9 for the pump 2 is calculated to produce an inclination angle instruction $X_{1i}$ for the pump 2, and control of the pump 2 is effected in step 46. However, since Kp=0 at this stage, the inclination angle instruction $X_{1i}$ for the pump 2 becomes zero so that the pump 2 is rendered neutral. Likewise, in step 47, an inclination angle instruction $X_{2i}(=Kp\cdot L_2)$ for the pump 3 is calculated. Then control of the pump 3 is effected in step 48. Since Kp=0 in this case too, the pump 3 is rendered neutral and the process is returned to the start of the program. Control routines 46 and 48 for the pumps 2 and 3 will be described later in detail. After checking whether or not the starter is ON in step 41, the process transfers to step 49 when N≧No in step 42. Here the engine speed deviation $\Delta N=Nr-N$ of the internal combustion engine 1 is first calculated, and its result is stored. Then in step 50, whether or not the condition is idling is judged based on the value of the target engine speed Nr. In case the condition is judged to be idling, in step 51, a rack displacement target value function $M=f_i(\Delta N)$ for idling condition written beforehand in a memory exclusively for read-out is collated to determine the rack displacement target value M, before the process transfers to step 52. When the condition is not judged to be idling in step 51, the process transfers to step 53. Here judgement is passed as to whether or not the condition is intermediate speed or high speed based on the value of the target engine speed Nr. When the condition is judged to be high speed, in step 54, a rack displacement target value function $M=f_h(\Delta N)$ for the condition of high speed is collated to determine the rack displacement target value M before the process transfers to step 52. When the condition is judged to be intermediate speed, in step 55, a rack displacement target value $M=f_p(\Delta N)$ for the condition of intermediate speed is collated to determine the rack displacement target value M before the process transfers to step 52.

In step 52, the maximum value Mmax=g (N) of the rack displacement target value M written beforehand in a memory is collated based on engine speed N, and in the next step 56 the rack displacement target value M and its maximum value Mmax are compared with each other. When M>Mmax, in step 57, the rack displacement target value M is substituted as M=Mmax before the process transfers to step 58. If M≦Mmax, the process transfers to step 58 without changing the rack displacement target value M. In step 58, a rack displacement deviation $\Delta Y$ is calculated based on the rack displacement target value M and the rack displacement Y. In step 59 the calculated value $\Delta Y$ is supplied as an output to the current amplifier 19 shown in FIGS. 2 and 4.

Then in step 60, a pump control coefficient kp=h ($\Delta N$) written beforehand in a memory is collated based on the value of engine speed deviation $\Delta N$ before the process transfers to step 45. Thereafter, steps 45, 46, 47 and 48 are followed and then the process returns to the beginning.

Figure 14:
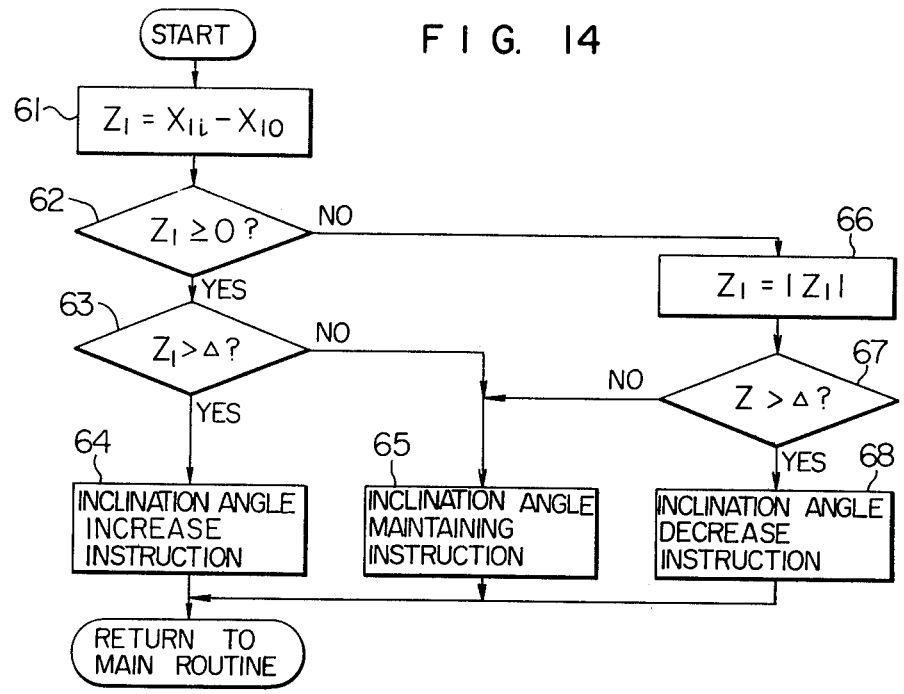
FIG. 14 is a flow chart showing the control of the pumps in the flow chart shown in FIG. 13.

The pump control routine carried out in step 46 will now be described by referring to FIG. 14. First of all, in step 61, an inclination angle deviation $Z_1=X_{1i}-X_{10}$ of the pump 2 is calculated.

Then in step, the inclination angle deviation $Z_1$ of the pump 2 is judged as to whether it is positive or negative. If it is found to be positive, the inclination angle deviation $Z_1$ is checked in step 63 as to whether or not it is greater than an dead zone $\Delta$. When $Z_1>\Delta$, then the process transfers to step 64, in which an inclination angle increase instruction for the pump 2 (instruction to energize the solenoids 22a and 23a of the electromagnetic valves 22 and 23 shown in FIG. 3) is issued as an output before the main routine is resumed. When $Z_1\leq\Delta$ in step 63, an inclination angle maintaining instruction for the pump 2 (instruction to energize the solenoids 23a and 25a of the electromagnets 23 and 25 shown in FIG. 3) is issued in step 65 before the main routine is resumed. When the inclination angle deviation $Z_1$ is negative in step 62, the process transfers to step 66 to take an absolute value of the inclination angle deviation $Z_1$, so that $Z_1=|Z_1|$. Then in step 67 the inclination angle deviation $Z_1$ and the dead zone $\Delta$ are compared as to the magnitude. When $Z_1 > \Delta$, an inclination angle decreasing instruction for the pump 2 (instruction to energize the solenoids 24a and 25a of the electromagnetic valves 24 and 25 shown in FIG. 3) is issued in step 68 before the main routine is resumed. When $Z_1 \leq \Delta$, the process transfers to step 65 in which an inclination angle maintaining instruction for the pump 2 is issued before the main routine is resumed. The aforesaid description concerns the pump 2. Description of the control routine for the pump 3 will be omitted because it is similar to that for the pump 2.

As described hereinabove, when the engine speed deviation of an internal combustion engine 1 becomes greater than the predetermined value, a pump control coefficient is calculated by using a function of the pump control coefficient prepared beforehand, and the inclination angle of each pump 2, 3 is controlled by using, as a target value of the inclination angle of each pump 2, 3, a value obtained by calculation done on the obtained pump control coefficient and the manipulated variable of the inclination angle of each pump 2, 3. The result of this is that it is possible to effect control of the output power of the internal combustion engine 1 in a full power control system having excellent responsiveness and dynamic stability. Also, a rack displacement target value for each of the conditions of idling, intermediate speed and high speed of the internal combustion engine 1 is calculated from a plurality of rack displacement target value functions prepared beforehand, and the amount of injected fuel is controlled based on the value obtained by the calculation, so that increased stability of the full power control system and prevention of engine shutdown are insured.

Moreover, the maximum value of rack displacement is calculated by using an adapting function prepared beforehand in accordance with the output engine speed of the internal combustion engine 1 or the accelerator manipulated variable, and the amount of injected fuel is controlled by the value obtained by the calculation, so that the needs to inhibit a reduction in the output torque of the internal combustion engine 1 in low engine speed region and to prevent black smoke production in high engine speed region are satisfied.

It will be understood that in the embodiment described hereinabove, it is possible to carry out the method by using a microcomputer as the control unit 13.

Figure 4:
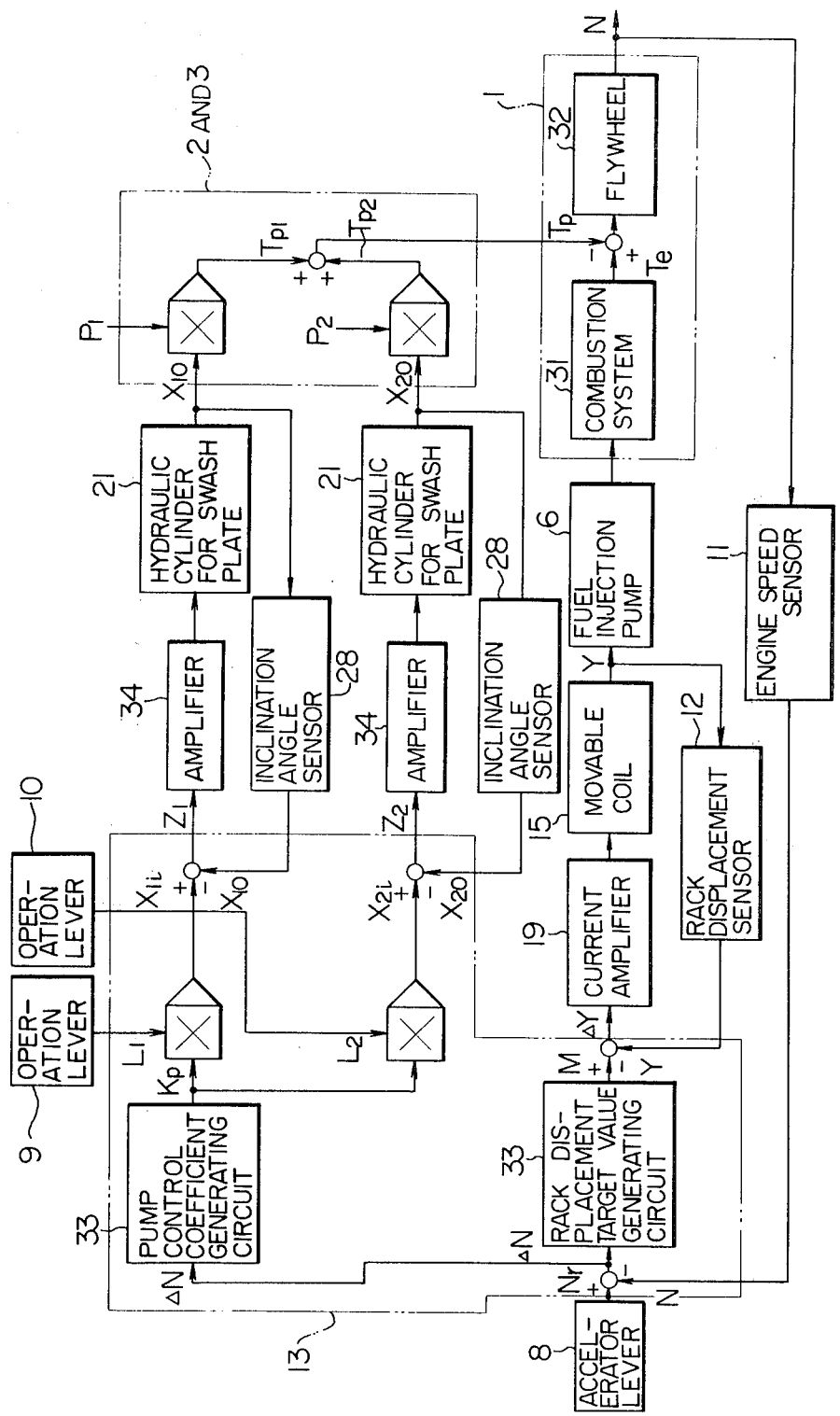
FIG. 4 is a block diagram in explanation of the first embodiment of the control method according to the invention incorporated in the system shown in FIG. 1.
Figure 5:
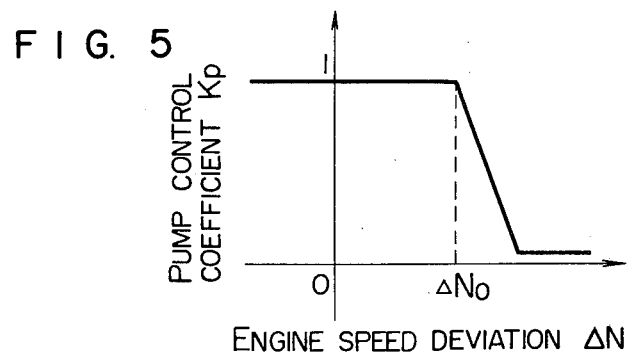
FIG. 5 is a diagrammatic view showing the characteristic of the pump control coefficient generating circuit used in the control method according to the invention.
Figure 15:
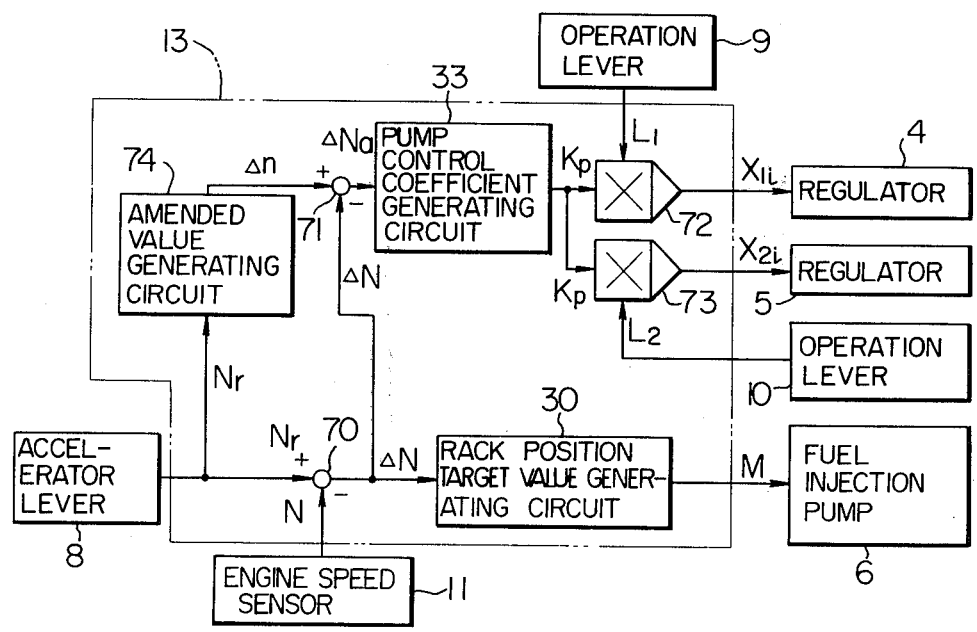
FIG. 15 is a block diagram of another embodiment of the control method in accordance with the invention carried outline 12 in the system shown in FIG. 1.

FIG. 15 shows another embodiment of the control unit 13 shown in FIG. 1 by simplifying the associated constructions as compared with the embodiment shown in FIG. 4.

In FIG. 15, 30 is a rack displacement target value generating circuit, 33 is a pump control coefficient generating circuit, 70 and 71 are adders, 72 and 73 are multipliers and 74 is an amended value generating circuit.

In the control device 13, the difference between the target engine speed Nr and the output engine speed N or the engine speed deviation $\Delta N$ is obtained by the adder 70, and the rack displacement target value M is obtained by the rack displacement target value generating circuit 30 from the engine speed deviation $\Delta N$ based on the function in the graph shown in FIG. 7. An amended value $\Delta n$ is obtained by the amended value generating circuit 74 from the target engine speed Nr based on the function shown in FIG. 16, the sum of the engine speed deviation $\Delta N$ and the amended value $\Delta n$ or an amended engine speed deviation $\Delta Na$ is obtained by the adder 71, the pump control coefficient Kp is obtained by the pump control coefficient generating circuit 33 from the amended engine speed deviation $\Delta Na$ based on the function shown in FIG. 17 similar to that shown in FIG. 5, and the products of the pump control coefficient Kp and the manipulated variables $L_1$ and $L_2$ or the inclination angle target values $X_{1i}$ and $X_{2i}$ are obtained by the multipliers 72 and 73.

Figure 8:
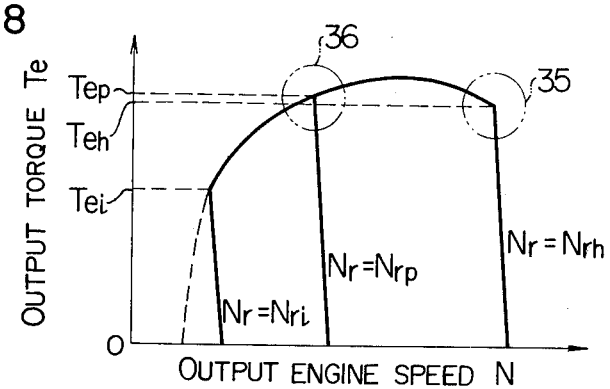
FIG. 8 is a diagrammatic view showing the characteristic of the output speed and the output torque of the internal combustion engine obtained when the characteristic shown in FIG. 7 is used.

The output characteristic of the internal combustion engine 1 when the control unit 13 shown in FIG. 4 is used has been described by referring to FIG. 8 which shows the relation between the output engine speed N and the output torque Te. The description will be repeated. When the target engine speed Nr is high (in case of Nr=Nrh), even if the torque reaction Tp becomes higher than Teh, the output torque Te can be over Teh when the output engine speed N drops, and therefore shutdown of the internal combustion engine 1 would not occur if the inclination of the characteristic of the pump control coefficient Kp is not made excessively steep or the inclination angle is not suddenly reduced. However, in case of intermediate speed (in case of Nr=Nrp) and in case of idling (in case of Nr=Nri), the internal combustion engine 1 would be shut down when the torque reaction Tp reaches Tep and Tei, because the output torque Te cannot be over Tep and Tei. To avoid this, the idea may come to mind that the inclination of the characteristic of the pump control coefficient Kp is set at a steep gradient so that when the engine speed deviation $\Delta N$ reaches a predetermined value, the inclination angle is suddenly reduced to thereby reduce the torque reaction Tp. In this case, however, there is the risk of causing the control system to oscillate because it is equivalent to increasing the gain constant of the system.

Figure 18:
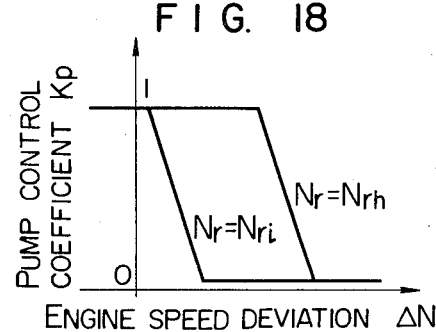
FIG. 18 is a diagrammatic view showing the relation between the engine speed deviation and the control coefficient in the control method shown in FIG. 15.

Therefore, in the control method of the embodiment shown in FIG. 15, an amended value $\Delta n$ that increases when the target engine speed Nr decreases is obtained by the amended value generating circuit 74, and the amended value $\Delta n$ is added to the engine speed deviation $\Delta N$ to obtain an amended engine speed deviation $\Delta Na$, and when the amended engine speed deviation $\Delta Na$ reaches a predetermined value $\Delta Nao$, the pump control coefficient Kp is reduced to thereby reduce the inclination angles of the pumps 2 and 3. This is the same as that, as shown in FIG. 18, with a large target engine speed Nr, the pump control coefficient Kp is reduced when the engine speed deviation $\Delta N$ has become large to a certain degree and with a small target engine speed Nr, the pump control coefficient Kp is reduced when the engine speed deviation $\Delta N$ is small. Consequently, in case of intermediate speed and idling, a slight increase in the engine speed deviation $\Delta N$ results in a reduction in the pump control coefficient Kp so as to reduce the inclination angles of the pumps 2 and 3 and thus reduce the torque reaction Tp. Thus, the torque does not exceed the maximum output torque of the internal combustion engine 1, so that shutdown of the internal combustion engine 1 can be avoided. That is, the relation between the output engine speed N and the torque reaction Tp becomes as shown in FIG. 19, and the torque reaction Tp does not exceed the maximum output torque of the internal combustion engine 1, because the inclination angles of the pumps 2 and 3 decrease if the delivery pressures $P_1$ and $P_2$ of the pumps 2 and 3 rise, thereby avoiding shutdown of the internal combustion engine 1.

Figure 16:
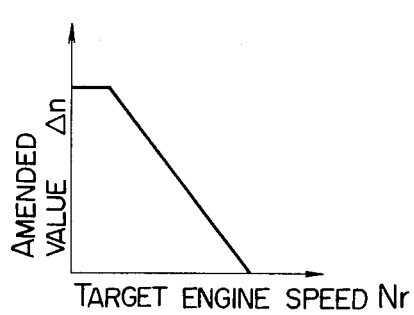
FIG. 16 is a diagrammatic view of the characteristic of an amended value generating circuit used in the control method shown in FIG. 15.
Figure 17:
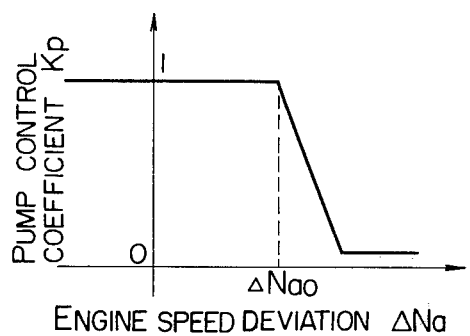
FIG. 17 is a diagrammatic view similar to FIG. 5 but showing the characteristic of the pump control coefficient generating circuit used in the control method according to the invention shown in FIG. 15.
Figure 19:
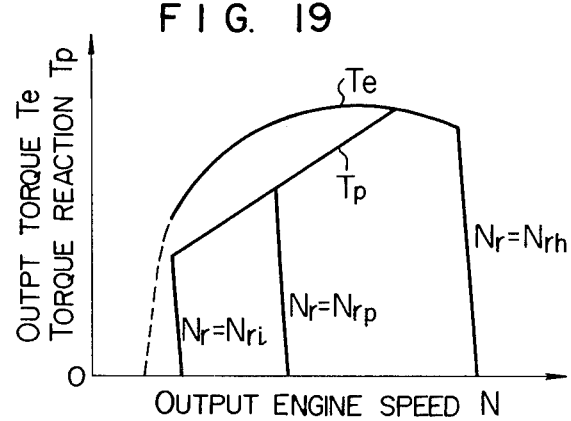
FIG. 19 is a diagrammatic view showing the relation between the output engine speed and the output torque and torque reaction of the internal combustion engine when the characteristic shown in FIG. 18 is used.
Figure 20:
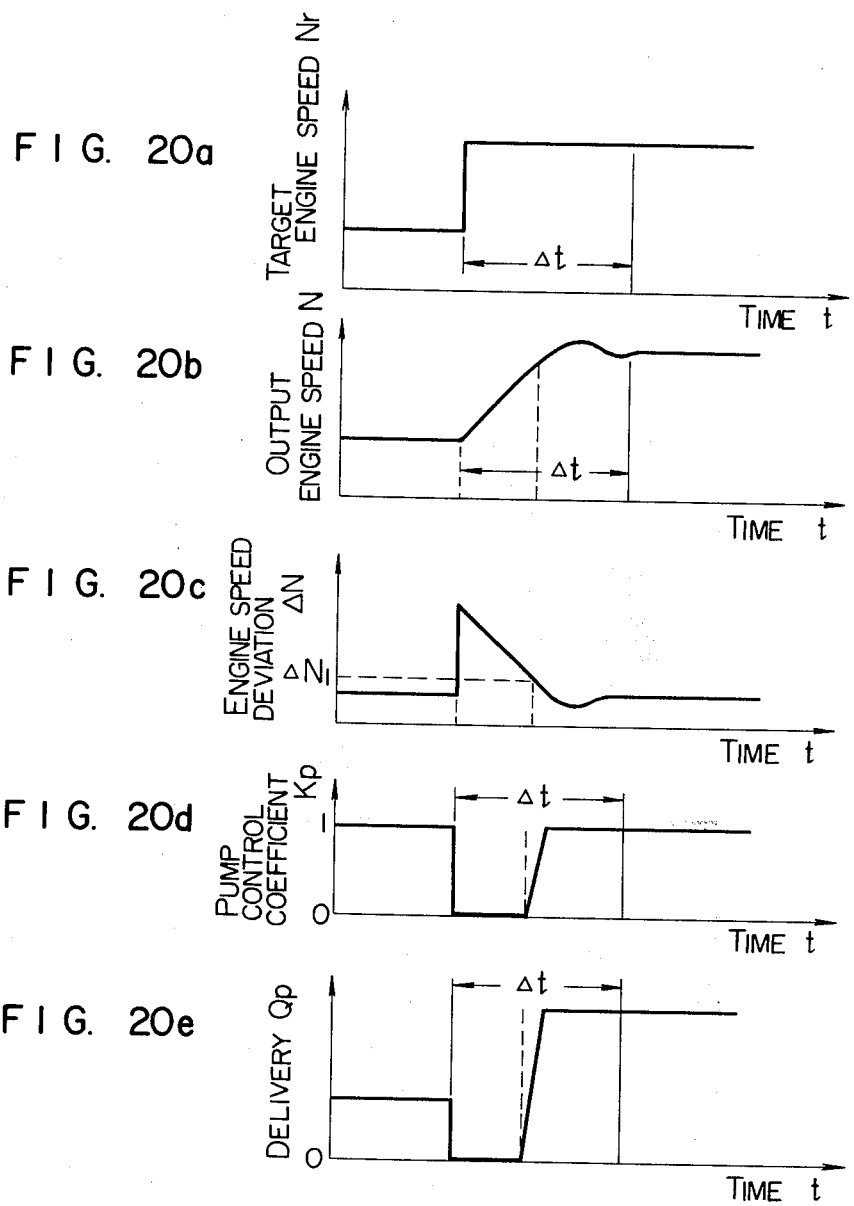
FIGS. 20a–20e are diagrammatic views showing chronological changes in the amounts of signals of target engine speed, output engine speed, engine speed deviation, pump control coefficient and pump delivery in the control method shown in FIG. 4.

It will be understood that by changing the relation between the target engine speed Nr and the amended value Δn shown in FIG. 16, it is possible to set as desired the relation between the output engine speed N and the torque reaction Tp shown in FIG. 19. It will also be understood that it is also possible to use a microcomputer as the control unit 13.

As described hereinabove, in the method according to the invention for controlling a system comprising an internal combustion engine 1 and hydraulic pumps 2, 3, shutdown of the internal combustion engine 1 never occurs no matter what value the target engine speed may have. Also, there is no need to suddenly reduce the inclination angles of the hydraulic pumps 2, 3 when the delivery pressures of the hydraulic pumps 2, 3 rise and the torque reaction increases, and therefore the inclination angles of the hydraulic pumps 2, 3 are not subject to periodical change, so that the stability of the system is ensured. Moreover, it is possible to readily set as desired the characteristic of the torque reaction of the hydraulic pumps 2, 3 with respect to the output engine speed to suit the condition of use to which the system is put.

A further improvement of the control method according to the invention will now be described.

In the control unit 13 of the embodiment shown in FIG. 4, the pump control coefficient generating circuit 33 is a function generator having a characteristic shown in FIG. 5. As described hereinabove, the engine speed deviation ΔN of the internal combustion engine is multiplied with the externally manipulated variable for the swash plates after it is converted into a pump control coefficient Kp by this function generator, to obtain a target swash plate inclination value for the hydraulic pump. In this construction, control is effected in such a manner that when the engine speed deviation ΔN becomes larger than the set value ΔN₁, the swash plate inclination angle is reduced to prevent the output torque of the internal combustion engine from being exceeded by the torque reaction from the hydraulic pumps.

FIGS. 20a–20e show changes in the output engine speed N, engine speed deviation ΔN, pump control coefficient Kp and pump delivery Qp corresponding to the pump inclination angle occurring when the accelerator lever is pulled to set a new target engine speed Nr in the aforesaid control method.

Pulling the accelerator lever provides a new value to the target engine speed Nr shown in FIG. 20a (assuming that the accelerator lever is instantaneously pulled). As shown in FIG. 20b, the output engine speed N increases until the rotation inertial body for the internal combustion engine is accelerated and the target engine speed Nr is reached. This makes a certain time necessary for the target engine 1 speed Nr to be reached. At this time, the engine speed deviation ΔN which is the difference between the target engine speed Nr and the output engine speed N is as shown in FIG. 20c, the pump control coefficient Kp which is set in association with the engine speed deviation ΔN is as shown in FIG. 20d, and the delivery Qp of the hydraulic pump is as shown in FIG. 20e. As can be clearly seen in these figures, Qp=0 is given as soon as the target engine speed Nr increases, and the Qp suddenly increases as the output engine speed N reaches the target engine speed Nr. Assuming that the hydraulic pressure of the hydraulic pump is used to drive motor for causing a vehicle body to travel, since the vehicle speed is proportional to Qp, the vehicle body would be stopped for an instant and then suddenly accelerated when the output engine speed N is increased and accelerated, so that operational performance would be markedly reduced.

This problem arises due to the fact that as soon as the accelerator lever is pulled, the engine speed deviation ΔN becomes large and exceeds the set value ΔNo as shown in FIG. 20c while the pump control coefficient Kp decreases to almost zero as shown in FIG. 20d. At this time, the output engine speed also tends to increase as shown in FIG. 20b. Thus, it will be seen that when the engine speed deviation ΔN and the output engine speed N both tend to increase, the control of the hydraulic pump to maintain the pump control coefficient Kp at a value prevailing before the accelerator lever is operated could obviate the aforesaid problem.

Figure 22:
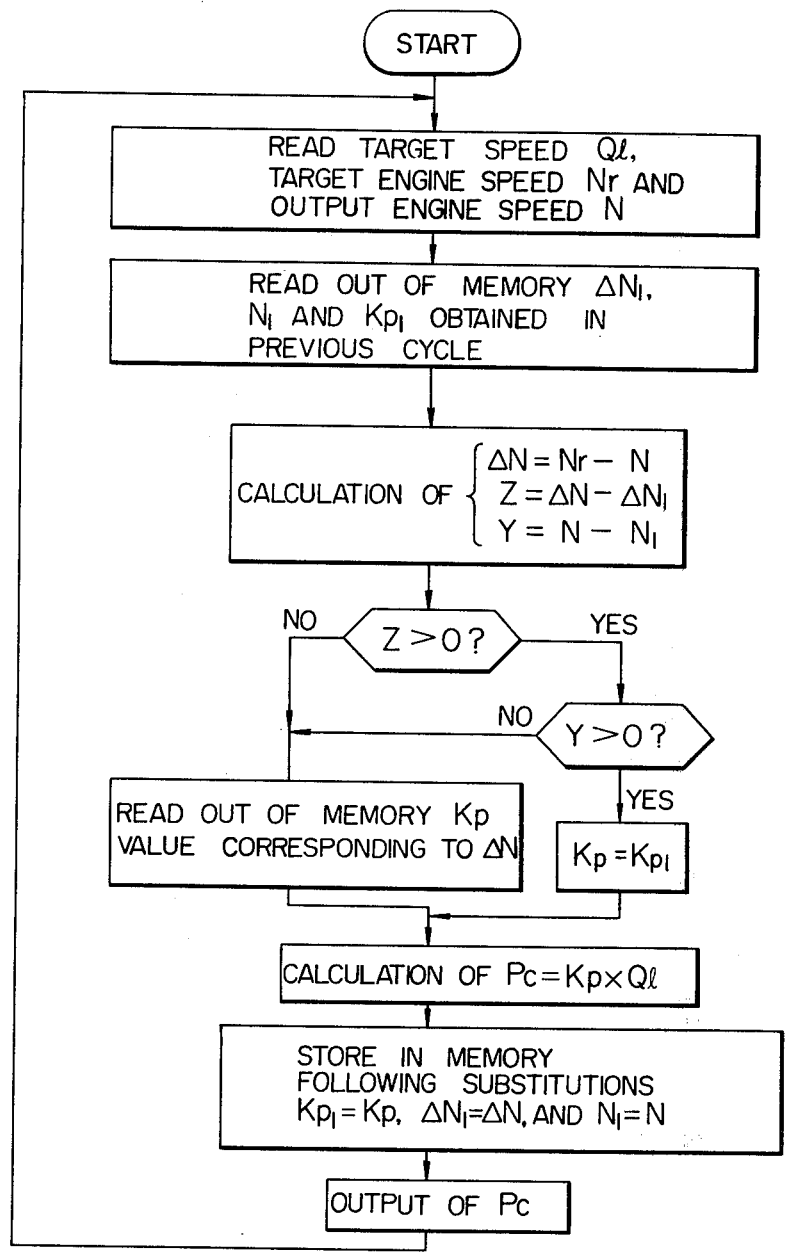
FIG. 22 is a flow chart showing one embodiment of the control method relying on the digital control device shown in FIG. 21, the example including the operation of pulling the accelerator lever.
Figure 23:
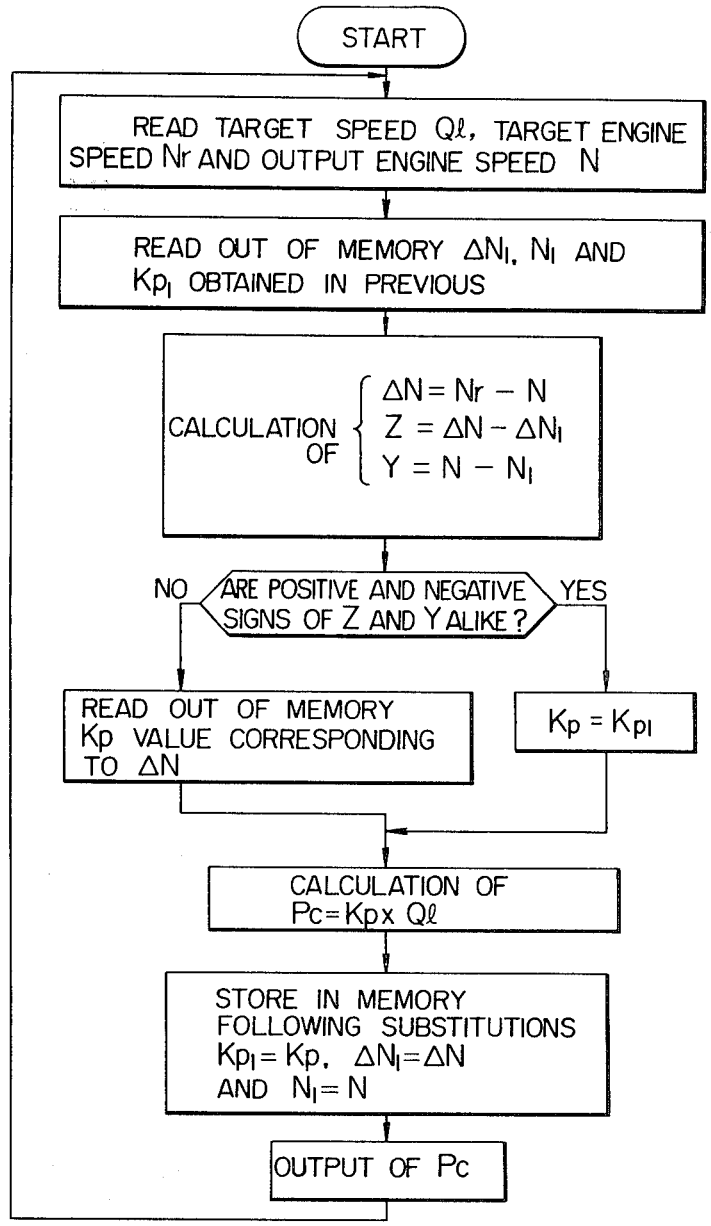
FIG. 23 is a flow chart similar to FIG. 22 but showing another embodiment including both the operation of pulling the accelerator lever and the operation of returning the accelerator lever.

FIGS. 21-23 show a further improvement of the control method according to the invention based on the aforesaid principle, in which FIG. 21 shows a system including a digital control device 100 for carrying out the improved method into practice.

First of all, the case of operation of pulling an accelerator lever 101 will be described by referring to FIGS. 21 and 22. A signal of the target speed Ql corresponding to the manipulated variable of an operation lever 109, a signal of the target engine speed Nr corresponding to the manipulated variable of the accelerator lever 101 and a signal of the output engine speed N of a sensor 104 are read to a central processing unit 100c through a multiplexor 100a and an A/D converter 100b. A memory 100d has stored therein beforehand the output engine speed $N_1$, engine speed deviation $\Delta N_1$ and a predetermined pump control coefficient $K_1$ obtained in the previous cycle. When a signal of target speed Ql, a signal of target engine speed Nrl and the engine speed N for the current cycle are read to the central processing unit 100c, the output engine speed $N_1$, engine speed deviation $\Delta N_1$ and pump control coefficient $Kp_1$ of the previous cycle are read out from the memory 100d to the central processing unit 100c. At the central processing unit 100c, calculation is done to obtain an engine speed deviation ΔN of the current cycle, the difference between the engine speed deviation ΔN and the aforesaid engine speed deviation value $\Delta N_1$ or a deviation Z, and the difference between the output engine speed N of the current cycle and the output engine speed $N_1$ of the previous cycle or a deviation value Y. The calculation is expressed by equations as follows:

$$\Delta N = Nr - N$$

$$Z = \Delta N - \Delta N_1$$

$$Y = N - N_1$$

At the central processing unit 100c, judgement is passed whether or not the deviation value Z is positive. If the deviation value Z is not positive but negative, then the value of a coefficient Kp corresponding to the engine speed deviation ΔN is read out from the memory 100d in which a function of Kp and ΔN having the characteristic shown in FIG. 5 is stored. If the deviation value Z is positive, then judgement is further passed as to whether or not the deviation value Y is positive. When the deviation value Y is not positive but negative, the value of Kp corresponding to the engine speed deviation ΔN is read out from the memory 100d as described hereinabove. When the deviation value Y is positive, the coefficient $Kp_1$ of the previous cycle is set as the coefficient Kp of the current cycle. Calculation is done at the central processing unit 100c to obtain a target pump delivery Pc, that is, Pc=Kp×Ql is performed. Then the coefficient Kp for the current cycle, the current engine speed deviation ΔN and the current output engine speed N are substituted as $Kp_1$, $\Delta N_1$ and $N_1$ respectively and stored in the memory 100d. The signal of target delivery Pc is supplied through an output unit 100e to a regulator 106 of a hydraulic pump 105.

In the control method carried out as aforesaid, the pump control coefficient $Kp_1$ of the previous cycle is used to perform calculation of the target pump delivery Pc when the deviation value Z and deviation value Y are both positive, that is, when the engine speed deviation becomes great and the output engine speed increases, so that the delivery Qp never becomes zero.

The operation of restoring the accelerator lever 101 will be described in brief. In the control method described by referring to FIG. 20, there is the possibility that the vehicle speed temporarily increases in spite of the accelerator lever 101 being restored. This is because when the torque reaction is in the range of maximum output torque of the engine and the coefficient Kp<1, the engine speed deviation ΔN becomes small due to the reduction in the target engine speed Nr to thereby increase the coefficient Kp. Thus, when this is the case, the deviation value Z and deviation value Y are calculated in the same manner as in the aforesaid operation of pulling the accelerator lever 101, and judgement is passed as to whether or not the deviation value Z and deviation value Y are negative. When they are both negative, the coefficient $Kp_1$ of the previous cycle is used as the Kp. Otherwise a predetermined coefficient Kp corresponding to the engine speed deviation of the current cycle is read out. By this arrangement, calculation of the target pump delivery Pc is done by using the pump control coefficient $Kp_1$ obtained in the previous cycle instead of the pump control coefficient corresponding to the engine speed deviation ΔN of the current cycle when the engine speed deviation becomes small and the output engine speed decreases, so that the vehicle speed can slow down in conformity with the output engine speed N without causing an increase in pump delivery.

As aforesaid, calculation is done to obtain the target pump delivery Pc by using the coefficient $Kp_1$ of the previous cycle when the deviation value Z and deviation value Y are both positive in the operation of pulling the throttle lever 101 and when the deviation value Z and deviation value Y are both negative in the operation of restoring the throttle lever 101. The end can be attained after all by performing the operation shown in a flow chart in FIG. 23. More specifically, the deviation value Z and deviation value Y are judged in the central processor 100c to determine whether their positive or negative signs are alike. Calculation is done to obtain the target pump delivery Pc by setting the pump control coefficient as the coefficient $Kp_1$ of the previous cycle when the signs are alike and by reading out from the memory 100d a coefficient Kp corresponding to the engine speed deviation ΔN of the current cycle when the signs are not alike.

The embodiment of the invention has been described hereinabove as using a digital calculator. However, the invention can achieve the same effect by using an analog circuit.

In the control method according to the invention described hereinabove, when the engine speed deviation, which is the difference between the target engine speed and the engine speed increases and the output engine speed also increases or when the engine speed deviation decreases and the output engine speed also decreases, calculation is done to obtain a traget pump delivery Pc by using the pump control coefficient $Kp_1$ obtained immediately before the accelerator lever is operated. This control method offers the advantages that a sudden change in delivery Qp can be avoided in a hydraulic pump, a smooth operation of the vehicle body can be realized, and troubles that would occur when the accelerator lever is operated, including the troubles that the vehicle speed decreases in spite of the operation performed to increase the output engine speed and the vehicle speed increases in spite of the operation performed to reduce the output engine speed, can be eliminated. Also, when acceleration of the engine is unobtainable due to the actuation of the operation lever or a sudden increase in load immediately after the operation of the accelerator lever, an ordinary control method works and no overload is applied to the engine.

Referring to FIGS. 20a–20e again, the problem discussed previously by referring thereto arises because the engine speed deviation ΔN rises above the set value ΔNo as shown in FIG. 20c while the pump control coefficient Kp decreases to almost zero as shown in FIG. 20d. At this time, the output engine speed N simultaneously increases as shown in FIG. 20b. The output engine speed N reaches the target engine speed Nr after a time Δt, and the engine speed deviation ΔN is restored to the steady state as shown in FIG. 20c which prevailed before the operation of the accelerator lever. Thus, it will be understood that the control of the hydraulic pumps 2, 3 effected without depending on the engine speed deviation ΔN during the time Δt from the operation of the accelerator lever to the restoration of the engine speed deviation ΔN to the steady state, could obviate the aforesaid problem.

Figure 24:
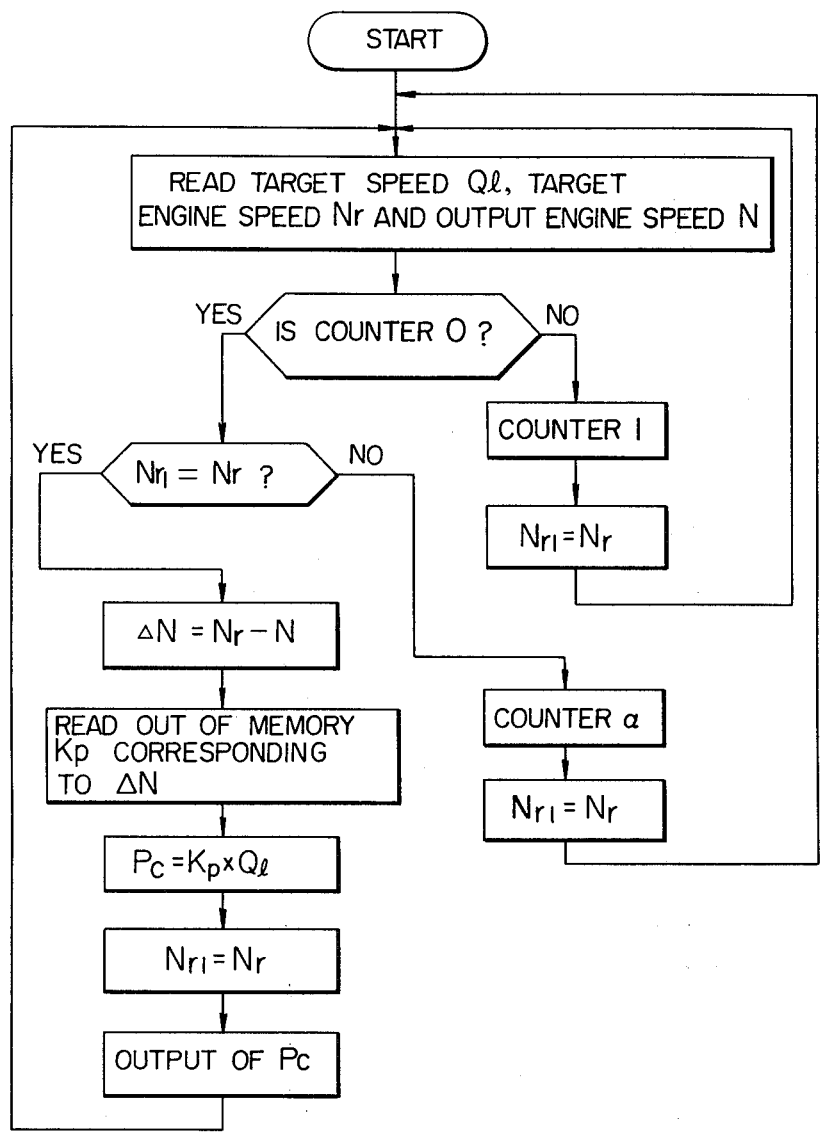
FIG. 24 is a flow chart showing still another embodiment of the control method relying on the digital control device shown in FIG. 21.
Figure 25:
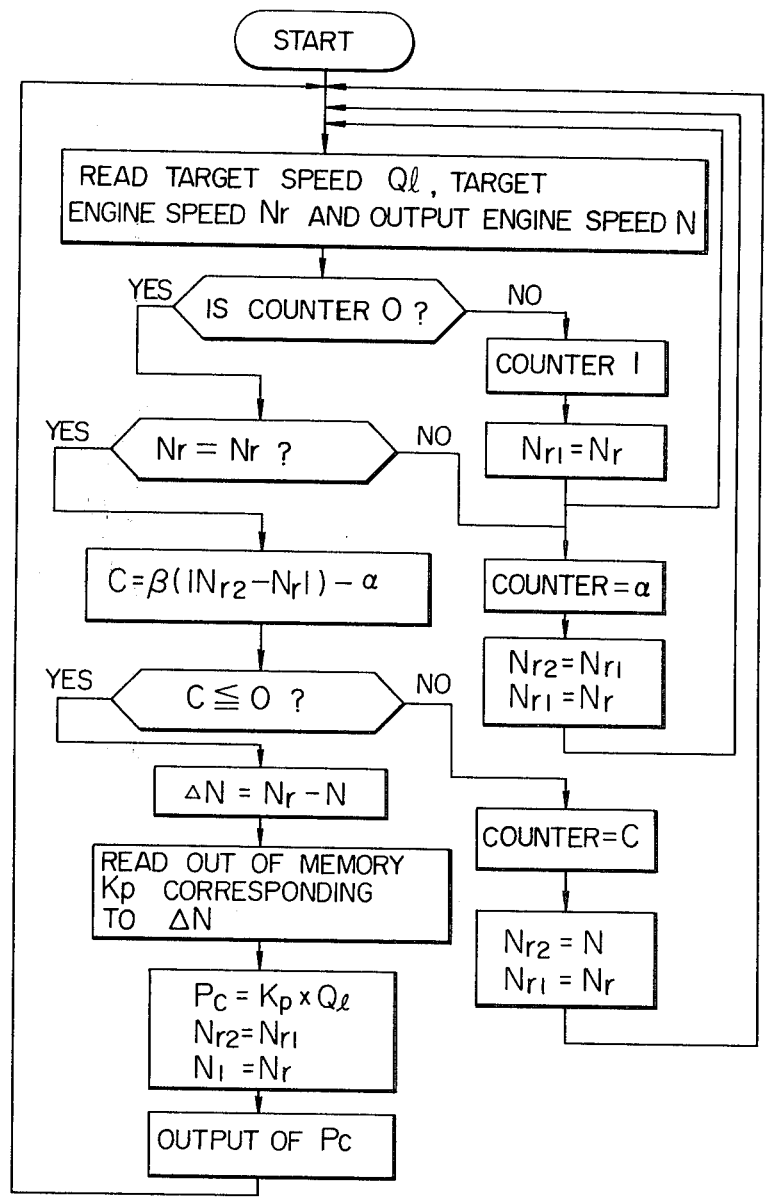
FIG. 25 is a flow chart showing an alternative of the embodiment of the control method according to the invention shown in FIG. 24.

FIGS. 24 and 25 show a further improvement of the control method according to the invention based on the principle described hereinabove. The digital control device 100 shown in FIG. 21 can be used as an apparatus for carrying this control method into practice. Therefore, the control method of FIGS. 24 and 25 will be described by referring to FIG. 21.

In the control method shown in FIG. 24, a signal of the manipulated variable or the target speed Ql generated by operation of the operation lever 109, a signal of the manipulated variable or the target engine speed Nr generated by operation of the accelerator lever 101 and a signal of an output engine speed N generated by the sensor 4 are read to the central processing unit 100c through the multiplexer 100a and A/D converter 100b. The target engine speed $Nr_1$ obtained in the previous cycle is stored in the memory 100d beforehand. When the target speed Ql signal, target engine speed Nr signal and output engine speed N of the current cycle are read to the central processor 100d as described above, judgement is passed as to whether or not the counter built in the central processing unit 100c is 0. When the counter is 0, judgement is passed as to whether or not the target engine speed $Nr_1$ of the previous cycle and the target engine speed Nr sensed this time are equal to each other. This is to confirm whether or not the accelerator lever 101 has been operated. When the target engine speeds Nr and $Nr_1$ are equal to each other, this means that the accelerator lever 101 has not been operated.

Thus, an ordinary control method is relied on to calculate the engine speed deviation $\Delta N$, to set a predetermined pump control coefficient Kp and to calculate the target pump delivery Pc at the central processing unit 100c, to store in the memory 100d the target engine speed Nr of the current cycle as $Nr_1$ and to cause the output device 100e to supply a target delivery Pc signal to the regulator 106. If the accelerator lever 101 has been operated, then the target engine speed Nr and $Nr_1$ do not become equal to each other, and at this time, the counter is set at a value $\alpha$. The value $\alpha$ is determined to conform to the length of aforesaid time $\Delta t$ shown in FIG. 20. Then the target engine speed Nr of the current cycle is stored as $Nr_1$ in the memory 100d. Once the counter is set at $\alpha$, the later judgement as to whether or not the counter is 0 becomes NO and calculation is done at the central processing unit 100c to deduct 1 from the value of the counter, and thereafter the target engine speed Nr of the present cycle is stored in the memory 100d by substituting it as $Nr_1$. After repeating this loop for 60 times, the counter becomes 0, and the process transfers to the judging routine for judging whether or not $Nr_1=Nr$ to confirm whether the accelerator level 101 has been operated. Thus, during the time from setting of the counter at $\alpha$ to reduction of the $\alpha$ to 0, the hydraulic pump 5 is controlled in accordance with the control value of the cycle immediately before operation of the accelerator lever 101. Stated differently, the hydraulic pump 105 is controlled in accordance with a target delivery Pc signal obtained in that cycle. Thus, it is possible to control the hydraulic pump 105 without being in any way influenced by a change in engine speed deviation $\Delta N$ during this period of time. The time $\Delta t$ (maintaining time) is a one loop time multiplied by $\alpha$ or a time obtained by multiplying the sume of the time required for judging whether or not the counter is 0, the time required for the calculation to reduce 1 from the value of the counter and the time required for storing the target engine speed Nr of the present cycle by substituting it as $Nr_1$ by the value $\alpha$ of the counter. When it is desired to prolong the time required for going through the one loop, one has only to prepare a program including a waste time.

FIG. 25 is a flow chart showing an alternative of the above described control method. It is advantageous from the practical point of view to cause the time $\Delta t$ to vary in proportion to the magnitude of a change in target engine speed Nr. This alternative has been developed in view of this circumstance. The basic concept or the technical concept that when the accelerator lever 101 is operated, the hydraulic pump 5 is controlled during a predetermined maintaining time in accordance with the target delivery signal of the cycle immediately before operation of the accelerator lever 101 is similar to that of the embodiment shown in FIG. 24. Therefore, matters distinct from those of the embodiment shown in FIG. 24 alone will be described. In this alternative, when the accelerator lever 101 is confirmed to have been operated in judging whether or not the accelerator lever 101 is operated or whether or not $Nr_1=Nr$, the target engine speed Nr of the current cycle is stored by substituting it as $Nr_1$ after the counter is set at a value $\alpha$, and at the same time the target engine speed $Nr_1$ of the previous cycle is stored as $Nr_2$. When this loop is gone through or when the counter has become 0 with the target engine speed Nr being equal to $Nr_1$, calculation is done on $C=\beta(|Nr_2-Nr|)-\alpha$ at the central processing unit 100c, where $|Nr_2-Nr|$ means the difference between the target engine speed $Nr_2$ of the cycle once before the maintaining time starts after the accelerator lever 101 is operated and the target engine speed Nr of the cycle after lapse of the maintaining time, or stated differently, $|Nr_2-Nr|$ means the manipulated variable of the accelerator lever 101, and $\beta$ is the proportional constant of this manipulated variable and the number of loop times. Since $\alpha$ is the number of the loop times that have occurred already, C is the number of the residual loop times in conformity with the manipulated variable of the accelerator lever 101. After calculation is done to obtain the value of C, judgement is passed as to whether or not $C\leq 0$ at the same central processing unit 100c. When $C\leq 0$, the number of the intended loop times have finished. Thus, at this time, the engine speed deviation $\Delta N$ of the present cycle is calculated, a predetermined pump control coefficient Kp corresponding to the engine speed deviation $\Delta N$ is set, and the target speed Ql is multiplied by the coefficient Kp to calculate the target delivery Pc. The target engine speed Nr of the present cycle is stored by substituting it as $Nr_1$, while the target engine speed $Nr_1$ of the previous cycle is stored by substituting it as $Nr_2$ in the memory 100d, and a target delivery Pc signal is issued by the output unit 100e to control the hydraulic pump 105. When $C>0$, this means that the time for going through the loop or the maintaining time is lacking by the number of times corresponding to C. Therefore, the counter of the central processing unit 100c is set at C, and then the target engine speed Br of the current cycle and the target engine speed $Nr_1$ of the previous target are stored by substituting them as $Nr_1$ and $Nr_2$ respectively in the memory. According to this alternative constitution, the time $\Delta t$, which is the maintaining time, can be varied in proportion to the manipulated variable of the accelerator lever 101 or the amount of change in the target engine speed Nr.

The control method according to the invention has been described as using a digital calculator, However, the invention can be achcieve similar effect by using an analog circuit.

As described hereinabove, in the control method according to the invention, when the accelerator lever is operated, the hydraulic pump is controlled by the target delivery signal of immediately before operation of the accelerator lever during a predetermined period of maintaining time, and the target pump delivery of the present cycle is calculated after lapse of the predetermined maintaining time, so that the hydraulic pump can be controlled based on the target delivery signal. Thus the operation of the hydraulic pump is not susceptible to the influences of changes in the engine speed deviation $\Delta N$, smooth operation of the vehicle body can be realized, and the troubles encountered in operating the accelerator lever including the troubles that the vehicle speed drops in spite of the operation being performed to increase engine speed and that the vehicle speed rises in spite of the operation being performed to decrease engine speed can be avoided.

The embodiments shown in FIGS. 22–25 have been described as the signal of the engine speed deviation $\Delta N$ is used by the digital control device 100 shown in FIG. 21 for controlling the inclination angle of the hydraulic pump. However, the same principle can be applied to the case of simultaneously controlling the amount of injected fuel (rack displacement) by the fuel injection pump of the internal combustion engine as well on the basis of the signal of the engine speed deviation $\Delta N$, as in the embodiments described based on the construction shown in FIGS. 1–4.

What is claimed is:

1. A method of controlling a system for generating hydraulic power, the system including an internal combustion engine controlled by fuel injection by a fuel injection pump, and a plurality of hydraulic pumps of the variable displacement type driven by the internal combustion engine, the method comprising the steps of calculating a difference between a target engine speed set by a manipulated variable of an accelerator for the internal combustion engine and an output engine speed to obtain an engine speed deviation; converting the engine speed deviation into a pump control coefficient which is in a functional relation with the engine speed deviation, performing a calculation with the converted pump control coefficient and an externally manipulated variable for inclination of a swash plate of the hydraulic pumps, and inputting the calculated value to a regulator of the hydraulic pump as a target value for inclination of the swash plate thereof to thereby control the inclination angle of the swash plate of the hydraulic pumps; and simultaneously converting said engine speed deviation into a rack displacement value which is in a functional relation with the engine speed deviation, and adjusting rack displacement of the fuel injection pump by the converted value to thereby control the amount of fuel injection.

2. A control method as claimed in claim 1, characterized in that the functional relation between said engine speed deviation and said pump control coefficient is such that the pump control coefficient decreases when the engine speed deviation becomes greater than a predetermined value.

3. A control method as claimed in claim 1, characterized in that the functional relation between said engine speed deviation and said rack displacement target value is such that the rack displacement target value gradually increases until the engine speed deviation reaches a predetermined value and thereafter the rack displacement target value is determined to conform to a running condition of the internal combustion engine based on either one of a plurality of functions set to correspond to the running conditions of idling, intermediate speed and high speed of the internal combustion engine.

4. A control method as claimed in claim 1, characterized in that the maximum rack displacement target value for each output speed of the internal combustion engine is set such that it decreases as the output engine speed increases, and when the rack displacement target value converted from said engine speed deviation is greater than the maximum rack displacement target value corresponding to the prevailing output engine speed, the rack displacement at the output engine speed is controlled by the maximum value that has been substituted for the rack displacement target value.

5. A control method as claimed in claim 2, characterized in that said predetermined value of the engine speed deviation is changed depending on said target engine speed.

6. A control method as claimed in claim 1, characterized in that said engine speed deviation is calculated with an amended value which increases as said target engine speed decreases to obtain an amended engine speed deviation, and the pump control coefficient decreases when said amended engine speed deviation becomes greater than a predetermined value.

7. A control method as claimed in claim 1, characterized in that an increment of said engine speed deviation which is the difference between said target engine speed and said output engine speed is calculated, an increment of said output engine speed is calculated, judgement is passed as to whether or not the positive and negative signs of the two increments are alike, and when the sign are alike, a pump control coefficient having a value corresponding to the pump control coefficient immediately before the signs of the two increments is used as the pump control coefficient to perform the calculation with said externally manipulated variable for the inclination of the swash plate.

8. A control method as claimed in claim 1, characterized in that a change in said target engine speed is sensed and when said target engine speed undergoes a change, said target values for inclination of the swash plates are maintained for a predetermined time at the target value of inclination of the swash plate immediately before the target engine speed undergoes the change.

9. A control method as claimed in claim 8, characterized in that said predetermined time is caused to vary depending on a change in target engine speed.

10. A method of controlling a system for generating hydraulic power, the system including an internal combustion engine, and at least one hydraulic pump of the variable displacement type driven thereby, the method comprising the steps of obtaining an engine speed deviation representing a difference between a target engine speed and an output engine speed is obtained based on a target engine speed signal produced by operation of an accelerator lever and an output engine speed signal detected by a sensor, converting said engine speed deviation into a corresponding pump control coefficient based on the pump control coefficient previously set as a function of the difference between the target engine speed and the output engine speed, performing a calculation with said pump control coefficient and a target speed based on a target speed signal produced by operation of an operation lever to obtain a pump delivery to thereby control the hydraulic pump in accordance with the target pump delivery signal calculating an increment of said engine speed deviation representing a difference between said target engine speed and said output engine speed, calculating an increment of said output engine speed, passing judgement as to whether or not the positive and negative signs of the two increments are alike, and, when the signs are alike, using a pump control coefficient having a value corresponding to the pump control coefficient immediately before the signs of the two increments become alike as said pump control coefficient of the two increments to perform the calculation with said target speed.

11. A method of controlling a system for generating hydraulic power, the system including an internal combustion engine, and at least one hydraulic pump of the variable displacement type driven thereby, the method comprising the steps of obtaining an engine speed deviation representing a difference between a target engine speed and an output engine speed based on a target engine speed signal produced by operation of an accelerator lever and an output engine speed signal detected by a sensor, converting said engine speed deviation into a corresponding pump control coefficient based on the pump control coefficient previously set as a function of the difference between the target engine speed and the output engine speed, performing a calculation with said pump control coefficient and a target speed based on a target speed signal produced by operation of an operation lever to obtain a target pump delivery to thereby control the hydraulic pump in accordance with the target pump delivery signal, detecting a change in said target engine speed, and maintaining, when said target engine speed undergoes a change, said target pump deliver for a predetermined time at the target pump delivery immediately before the target engine speed undergoes the change.

12. A control method as claimed in claim 11, characterized in that said predetermined time is caused to vary depending on a change in target engine speed.

* * * * *